US010255423B2

(12) United States Patent
Johri et al.

(10) Patent No.: US 10,255,423 B2
(45) Date of Patent: *Apr. 9, 2019

(54) SYSTEMS AND METHODS FOR PROVIDING IMAGE-BASED SECURITY MEASURES

(71) Applicant: Facebook, Inc., Menlo Park, CA (US)

(72) Inventors: Nikhil Johri, Mountain View, CA (US); Trevor M. Pottinger, Mountain View, CA (US); Balamanohar Paluri, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/590,901

(22) Filed: May 9, 2017

(65) Prior Publication Data

US 2017/0242997 A1     Aug. 24, 2017

Related U.S. Application Data

(63) Continuation of application No. 14/622,688, filed on Feb. 13, 2015.

(51) Int. Cl.
*G06F 21/36* (2013.01)
*G06K 9/00* (2006.01)
*G06K 9/62* (2006.01)

(52) U.S. Cl.
CPC ............ *G06F 21/36* (2013.01); *G06K 9/00* (2013.01); *G06K 9/6262* (2013.01); *G06F 2221/2133* (2013.01)

(58) Field of Classification Search
CPC .. G06F 21/31; G06F 21/36; G06F 2221/2133; G06K 9/00; G06K 9/6262
USPC .......................................... 726/7, 19
See application file for complete search history.

(56) References Cited

U.S. PATENT DOCUMENTS

| | | | | |
|---|---|---|---|---|
| 8,904,493 | B1* | 12/2014 | Dibble | H04L 63/08 726/4 |
| 2004/0128392 | A1* | 7/2004 | Blakley, III | H04L 63/083 709/229 |
| 2010/0325706 | A1* | 12/2010 | Hachey | H04L 9/3271 726/6 |
| 2013/0156331 | A1* | 6/2013 | Kurabayashi | G06K 9/00228 382/224 |
| 2015/0286898 | A1* | 10/2015 | Di | G06K 9/46 382/224 |

* cited by examiner

*Primary Examiner* — Kambiz Zand
*Assistant Examiner* — Aubrey H Wyszynski
(74) *Attorney, Agent, or Firm* — Sheppard Mullin Richter & Hampton LLP

(57) ABSTRACT

Systems, methods, and non-transitory computer-readable media can detect an operation that causes a challenge response process to be initiated. An image category associated with a recognized category label can be identified. At least one image associated with the image category can be displayed during the challenge response process. The operation can be executed when the challenge response process, based on the at least one image, is successfully completed.

20 Claims, 12 Drawing Sheets

SYSTEMS AND METHODS FOR PROVIDING IMAGE-BASED SECURITY MEASURES

CROSS-REFERENCE TO RELATED APPLICATIONS

This application is a continuation of U.S. patent application Ser. No. 14/622,688, filed on Feb. 13, 2015 and entitled "SYSTEMS AND METHODS FOR PROVIDING IMAGE-BASED SECURITY MEASURES", which is incorporated herein by reference in its entirety.

FIELD OF THE INVENTION

The present technology relates to the field of computing security. More particularly, the present technology relates to techniques for providing image-based security measures.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system. In some instances, however, illegitimate users may attempt to perform illegitimate or undesirable operations, such as by attempting to post malicious or spam links via the social networking system.

Under conventional approaches, security measures can be implemented in attempt to prevent or reduce the occurrence of illegitimate or undesirable operations. However, such conventional security measures can often times increase friction or create obstacles for legitimate users attempting to perform legitimate or permitted operations. Moreover, in some cases, illegitimate users can overcome conventional security measures and thus successfully perform illegitimate or other undesirable operations. As such, conventional approaches to providing security measures can be inconvenient, inefficient, and ineffective. Such conventional approaches can create challenges for or reduce the overall user experience associated with utilizing social networking systems.

SUMMARY

Various embodiments of the present disclosure can include systems, methods, and non-transitory computer readable media configured to detect an operation that causes a challenge response process to be initiated. An image category associated with a recognized category label can be identified. At least one image associated with the image category can be displayed during the challenge response process. The operation can be executed when the challenge response process, based on the at least one image, is successfully completed.

In an embodiment, a user input can be received during the challenge response process. The user input can be received subsequent to the at least one image being displayed. It can be determined that the user input indicates that the at least one image is associated with the recognized category label. An indication that at least a portion of the challenge response process is successfully completed can be provided.

In an embodiment, the recognized category label can be presented during the challenge response process via at least one of 1) a natural language description or 2) a multiple choice selection.

In an embodiment, the at least one image can be included in a collection of images displayed during the challenged response process. The user input can be included in a collection of user inputs received during the challenge response process.

In an embodiment, each user input in the collection of user inputs can correspond respectively to each image in the collection of images. The indication that at least the portion of the challenge response process is successfully completed can be provided when at least a threshold quantity of user inputs in the collection of user inputs correctly indicate one or more respective recognized category labels for corresponding images in the collection of images.

In an embodiment, at least one second image that is below a specified confidence threshold level of being associated with the image category can be displayed during the challenge response process. A user input can be received during the challenge response process. The user input can be received subsequent to the at least one second image being displayed.

In an embodiment, it can be determined that the user input indicates that the at least one second image is unassociated with the recognized category label. An indication that at least a portion of the challenge response process is successfully completed can be provided.

In an embodiment, detecting the operation that causes the challenge response process to be initiated can further comprise determining that a content item to be posted via a social networking system is associated with an illegitimacy confidence score at least meeting a specified illegitimacy score threshold.

In an embodiment, the at least one image can be determined, based on an image classification process, to be associated with the recognized category label. The image classification process can utilize at least one image classifier trained based on a set of images associated with the image category.

In an embodiment, the set of images can be updated via the social networking system over time.

In an embodiment, the at least one image can be at least one of 1) selected to exclude a representation of a face, 2) modified to remove the representation of the face, or 3) modified to obscure the representation of the face.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
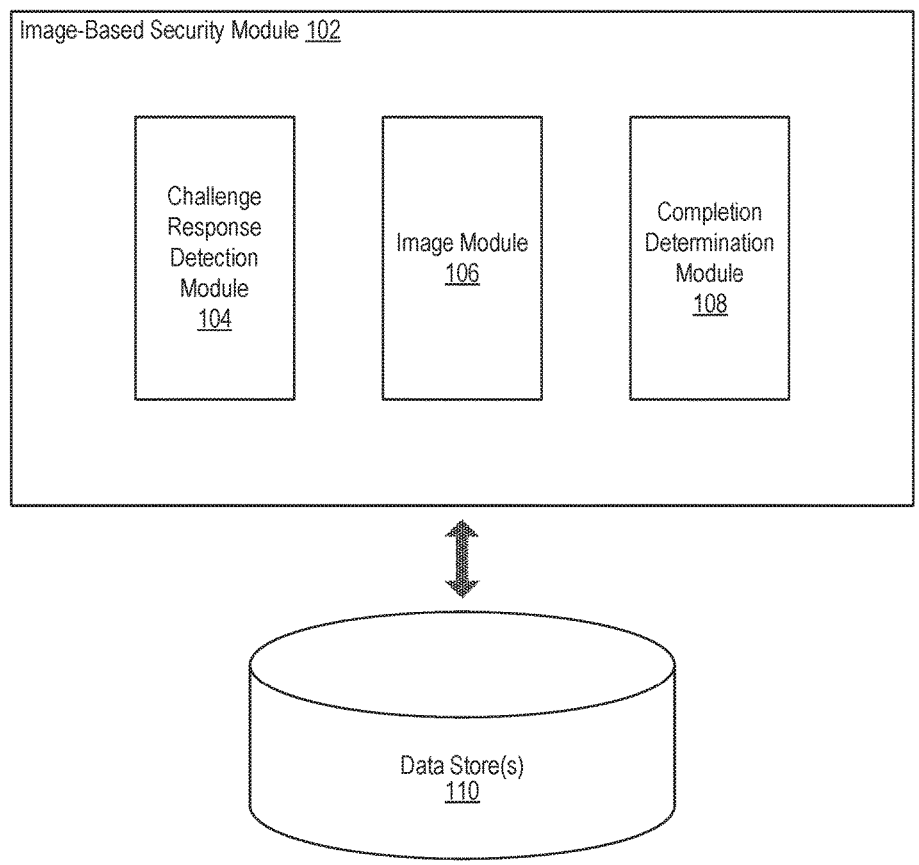
FIG. 1 illustrates an example system including an example image-based security module configured to facilitate providing image-based security measures, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Image-Based Security Measures

People use computing devices (or systems) for a wide variety of purposes. Computing devices can provide different kinds of functionality. Users can utilize their computing devices to produce information, access information, and share information. In some cases, users can utilize computing devices to interact or engage with a social networking system (i.e., a social networking service, a social network, etc.). For example, users can provide, post, or publish content items, such as text, notes, status updates, links, pictures, videos, and audio, via the social networking system.

In some instances, there can be illegitimate users, such as spam-bots, who attempt to perform illegitimate operations or undesirable activities. For example, such illegitimate users can attempt to post phishing, malicious, suspicious, or other harmful links via the social networking system. Under conventional approaches, security measures can be implemented in attempt to prevent or reduce such illegitimate or undesirable operations.

In one example, when a potentially illegitimate (or undesirable) operation is detected, conventional security measures can provide a text captcha which requires a user to correctly input text that is displayed in the text captcha. However, often times the legibility of the text can be low even for legitimate users (e.g., human users), and thus legitimate users can fail the conventional text captcha security measure. Also, it is becoming increasingly commonplace for illegitimate users (e.g., spam-bots, machines, computer programs, etc.) to correctly decipher the text presented via conventional text captcha security measures, such as by utilizing optical character recognition (OCR) processes. Accordingly, conventional approaches to providing security measures can be inconvenient, inefficient, and/or ineffective. Such conventional approaches can create challenges for or reduce the overall user experience associated with utilizing social networking systems.

Therefore, an improved approach can be beneficial for addressing or alleviating various concerns associated with conventional approaches. The disclosed technology can provide image-based security measures, such as image-based captcha challenge response processes. Various embodiments of the present disclosure can detect an operation that causes a challenge response process to be initiated. An image category associated with a recognized category label can be identified. At least one image associated with the image category can be displayed during the challenge response process. The operation can be executed when the challenge response process, based on (i.e., based at least in part on) the at least one image, is successfully completed. It is contemplated that there can be many variations and/or other possibilities.

FIG. 1 illustrates an example system 100 including an example image-based security module 102 configured to facilitate providing image-based security measures, according to an embodiment of the present disclosure. As shown in the example of FIG. 1, the image-based security module 102 can include a challenge response detection module 104, an image module 106, and a completion determination module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the image-based security module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the image-based security module 102 can be implemented, in part or in whole, as software running on one or more computing devices or systems, such as on a user or client computing device. For example, the image-based security module 102 or at least a portion thereof can be implemented as or within an application (e.g., app), a program, or an applet, etc., running on a user computing device or a client computing system, such as the user device 710 of FIG. 7. In another example, the image-based security module 102 or at least a portion thereof can be implemented using one or more computing devices or systems that include one or more servers, such as network servers or cloud servers. In some instances, the image-based security module 102 can, in part or in whole, be implemented within or configured to operate in conjunction with a social networking system (or service), such as the social networking system 730 of FIG. 7. It should be understood that there can be many variations or other possibilities.

Furthermore, in some embodiments, the image-based security module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the image-based security module 102. For instance, the at least one data store 110 can store images as well as categories and/or labels recognized for the images, which can be utilized by the image module 106. It is contemplated that there can be many variations or other possibilities.

The challenge response detection module 104 can be configured to facilitate detecting an operation that causes a challenge response process to be initiated. In some embodiments, the challenge response detection module 104 can acquire, calculate, or determine a confidence score for an operation. The confidence score for the operation can indicate a likelihood that the operation is illegitimate or otherwise undesirable. In some cases, if it is determined that the confidence score at least meets a specified threshold, then the operation is considered illegitimate and the operation causes the challenge response process to be initiated, which can be detected by the challenge response detection module 104.

In one example, the challenge response detection module 104 can determine that a content item to be posted via the social networking system is associated with an illegitimacy confidence score at least meeting a specified illegitimacy score threshold, such as an operation to post a malicious link via the social networking system. In another example, an operation to log into an online account can cause the challenge response process to be provided. In a further example, an operation to access an online service can cause the challenge response process to be provided. It should be understood that there can be numerous variations and possibilities.

As discussed, the disclosed technology can provide image-based security measures. In some cases, the image-based security module 102 can utilize the image module 106 to facilitate providing the image-based security measures. The image module 106 can be configured to identify an image category associated with a recognized category label. For example, the image module 106 can identify a flower image category having a recognized category label "flowers". Moreover, the image module 106 can be configured to display, during the challenge response process, at least one image associated with the image category. For instance, the image module 106 can display one or more images including one or more flowers or portions thereof in each of the images. The images can be displayed by the image module 106 as part of the challenge response process. More details regarding the image module 106 will be provided below with reference to FIG. 2A.

Furthermore, the completion determination module 108 can be configured to facilitate executing the operation when the challenge response process, based on the at least one image, is successfully completed. In one example, the completion determination module 108 can determine that a user has correctly identified the at least one image, displayed during the challenge response process, as being associated with its recognized category label and/or as being unassociated with a different category label. In this example, the completion determination module 108 can thus determine that the challenge response process, based on the at least one image, has been successfully completed and can execute the operation. The completion determination module 108 will be discussed in more detail with reference to FIG. 2B.

Figure 2A:
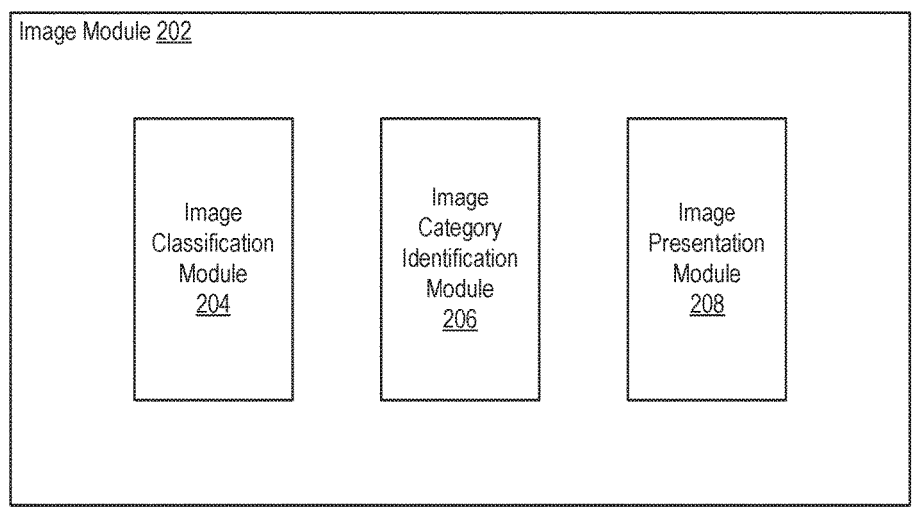
FIG. 2A illustrates an example image module configured to facilitate providing image-based security measures, according to an embodiment of the present disclosure.

FIG. 2A illustrates an example image module 202 configured to facilitate providing image-based security measures, according to an embodiment of the present disclosure. In some embodiments, the image module 106 of FIG. 1 can be implemented as the example image module 202. As shown in FIG. 2A, the image module 202 can include an image classification module 204, an image category identification module 206, and an image presentation module 208.

As discussed previously, the image module 202 can be configured to identify the image category associated with the recognized category label and to display, during the challenge response process, at least one image associated with the image category. In some cases, the at least one image can be determined to be associated with the recognized category label based on (i.e., based at least in part on) an image classification process. The image classification process can, for example, be applied to the at least one image by the image classification module 204. The image classification process can utilize at least one image classifier (e.g., image classification model) trained based on a set of images associated with the image category. In some cases, the set of images can already be known or recognized as being associated with the image category (i.e., concept, theme, subject, topic, etc.). In some implementations, the set of images can be updated via a social networking system over time.

In one example, a set of images that depict tigers can be known or recognized to be associated with a tiger image category. The image classification module 204 can train a tiger classifier based on the set of images already known or recognized as being associated with the tiger image category. The tiger classifier can be utilized in the image classification process to detect new images that depict tigers and thus determine that the new images are associated with a "tiger" category label. In another example, a set of images that depict flowers can be known or recognized to be associated with a flower image category. The image classification module 204 can train a flower classifier based on the set of images already known or recognized as being associated with the flower image category. The flower classifier can be utilized in the image classification process to detect new images that depict flowers and thus determine that the new images are associated with a "flower" category label. Many variations are possible.

In some cases, the image classification process can involve analyzing images to determine their potential relevance with a particular category, concept, object, subject, topic, and/or theme, etc. Image classification analysis can be based on myriad techniques, for instance. The images can be analyzed and classified based on any suitable processing technique. In one example, an image classification process or technique can gather contextual cues for the images and use the contextual cues to generate a learning set of images. The learning set of images can be used to train a classifier to generate visual pattern templates of an image class (or a category of objects, an image category, an image concept, etc.). The classifier can score an evaluation set of images based on correlation with the visual pattern templates. The highest scoring images of the evaluation set of images can be deemed to be mostly closely related to the image class. As another example, a hint detection technique can include natural language processing (NLP) to assist in identifying hints in comments associated with an image. The NLP-based hint detection technique can identify, based at least in part on natural language processing, one or more tokens in a comment that can assist in determining the subject matter(s) or object(s) of the image. It should be understood that other suitable techniques can be used and that many variations are possible.

Moreover, in some implementations, the image category identification module 206 can facilitate identifying the image category associated with the recognized category label. In some cases, there can be a plurality of image categories, each having a respective recognized category label. In one example, a cat image category can have a respective recognized "cat" category label. In another example, a nature image category can have a respective recognized "nature" category label. In some embodiments, the image category identification module 206 can randomly identify or choose a particular image category out of the plurality of image categories. In some implementations, the image category identification module 206 can identify or choose a particular image category based on information about the user who is performing the operation that caused the image-based challenge response process to be initiated. In one example, the information about the user can indicate a location (e.g., Paris, France) of the user. In this example, the image category identification module 206 can identify an image category (e.g., Eiffel Tower) based on the location of the user. In another example, the information about the user can include social engagement or interaction data, which can indicate topics or subjects the user has commented upon, liked, and/or shared, etc. In this example, the image category identification module 206 can identify an image category based on such topics or subjects. It should be appreciated that there can be many variations and/or other possibilities.

Furthermore, in some embodiments, the image presentation module 208 can facilitate displaying, during the challenge response process, at least one image associated with the image category. To reiterate, the at least one image can be determined to be associated with the image category based on the image classification process. The at least one image associated with the image category can be acquired from a database (e.g., data store 110 in FIG. 1) based on a query or request made by the image presentation module 208. Additionally, in some cases, the image presentation module 208 can select the at least one image such that the at least one image excludes one or more representations of one or more faces (or portions thereof). In some instances, the image presentation module 208 can modify the at least one image to remove one or more representations of one or more faces. In some cases, the image presentation module 208 can modify the at least one image to obscure one or more representations of one or more faces.

Moreover, in some instances, the at least one image can be selected out of a set of images recently published or posted via the social networking system. The recency of the at least one image used in the challenge response process can increase the difficulty for illegitimate users, such as spam-bots, to successfully complete or pass the challenge response process. Illegitimate users, such as spam-bots, generally lack the resources to sufficiently or accurately determine the recognized category label for the at least one image. Further, in one example, the at least one image can be publicly accessible. In another example, the at least one image can be displayed to the user during the challenge response process if one or more privacy settings associated with the at least one image enable the at least one image to be accessible to the user. It is contemplated that many variations are possible.

Figure 2B:
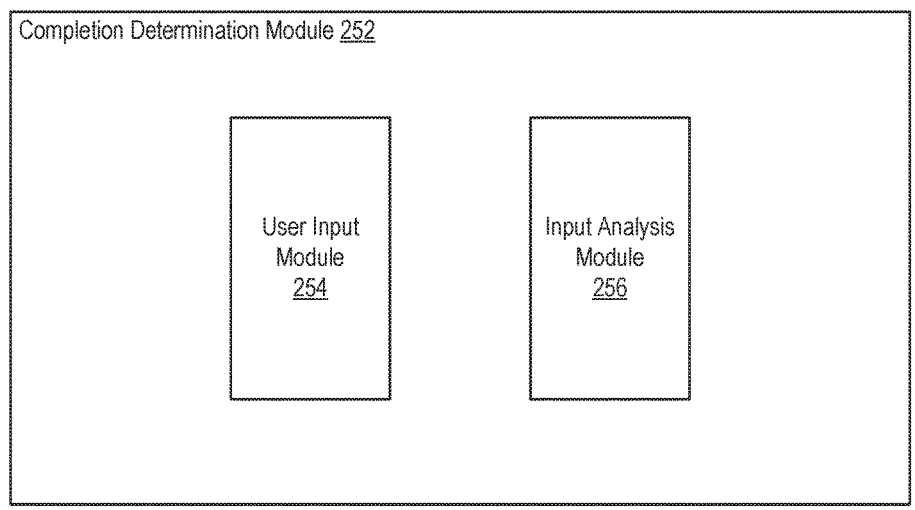
FIG. 2B illustrates an example completion determination module configured to facilitate providing image-based security measures, according to an embodiment of the present disclosure.

FIG. 2B illustrates an example completion determination module 252 configured to facilitate providing image-based security measures, according to an embodiment of the present disclosure. In some embodiments, the completion determination module 108 of FIG. 1 can be implemented as the example completion determination module 252. As shown in FIG. 2B, the completion determination module 252 can include a user input module 254 and an input analysis module 256.

As discussed previously, the completion determination module 252 can be configured to facilitate executing the operation when the challenge response process, based on the at least one image, is successfully completed. In some implementations, the user input module 254 of the completion determination module 252 can be configured to receive a user input during the challenge response process. The user input can be received subsequent to the at least one image being displayed. The input analysis module 256 can be configured to analyze the user input. In some instances, the input analysis module 256 can determine that the user input indicates that the at least one image is associated with the recognized category label. As a result, the completion determination module 252 can provide an indication that at least a portion of the challenge response process is successfully completed.

In one example, a user can attempt to perform a link post operation via the social networking system. The social networking system can determine that the link post operation may potentially be associated with malicious content and/or that the user may potentially be a spam-bot. As such, the social networking system can utilize image-based security measures and initiate the challenge response process based on the at least one image. In this example, the at least one image displayed to the user during the challenged response process can depict a dog. Continuing with this example, the user can provide a user input in reply to the at least one image displayed during the challenge response process. The user input can be received by the user input module 254. The input analysis module 256 can determine that the user input correctly indicates that the at least one image is associated with a "dog" category label. The completion determination module 252 can then provide the indication that at least a portion of the challenge response process is successfully completed. When the challenge response process is successfully completed, the link post operation can be permitted at the social networking system.

In some embodiments, the recognized category label can be presented during the challenge response process, such as by displaying the recognized category label with the at least one image displayed during the challenge response process. In one example, the recognized category label can be presented via a multiple choice selection, along with at least one different category label presented via at least one other multiple choice selection. The user has to correctly choose the appropriate multiple choice selection in order to pass the challenge response process (or at least the current portion thereof). In another example, the recognized category label can be presented via a natural language description, such as in the form of a question (e.g., "Does this picture include a dog?"). The user has to correctly reply to the natural language description in order to pass the challenge response process, such as by inputting the correct answer to the question. Many variations are possible.

Furthermore, in some implementations, the at least one image can be included in a collection of images displayed during the challenged response process. The user input can be included in a collection of user inputs received during the challenge response process. In some cases, each user input in the collection of user inputs can correspond respectively to each image in the collection of images. The indication that at least the portion of the challenge response process is successfully completed can be provided when at least a threshold quantity of user inputs in the collection of user inputs correctly indicate one or more respective recognized category labels for corresponding images in the collection of images. In one example, the challenge response process can display a series or plurality of images including a first subset of images depicting tigers and a second subset of images depicting flowers. In this example, if the user inputs correctly indicate, nine times out of ten (i.e., a specified threshold quantity or proportion), that images in the first subset are associated with a "tiger" category label and that images in the second subset are associated with a "flower" category label, then the challenge response process (or at least the current portion thereof) is successfully completed. It is understood that there can be many variations and other possibilities.

Additionally, in some cases, at least one second image that is below a specified confidence threshold level of being associated with the image category can be displayed during the challenge response process. For example, if the image category is identified to be a tiger image category, then the at least one second image can depict a topic, subject, concept, theme, and/or object other than a tiger. Accordingly, the at least one second image can be referred to as a negative sample for the challenge response process. In this example, the user input module 254 can receive a user input subsequent to the at least one second image being displayed. The input analysis module 256 can determine that the user input indicates that the at least one second image is unassociated with the recognized category label. As a result, the completion determination module 252 can provide an indication that at least a portion of the challenge response process is successfully completed. Again, many variations are possible.

Figure 3A:
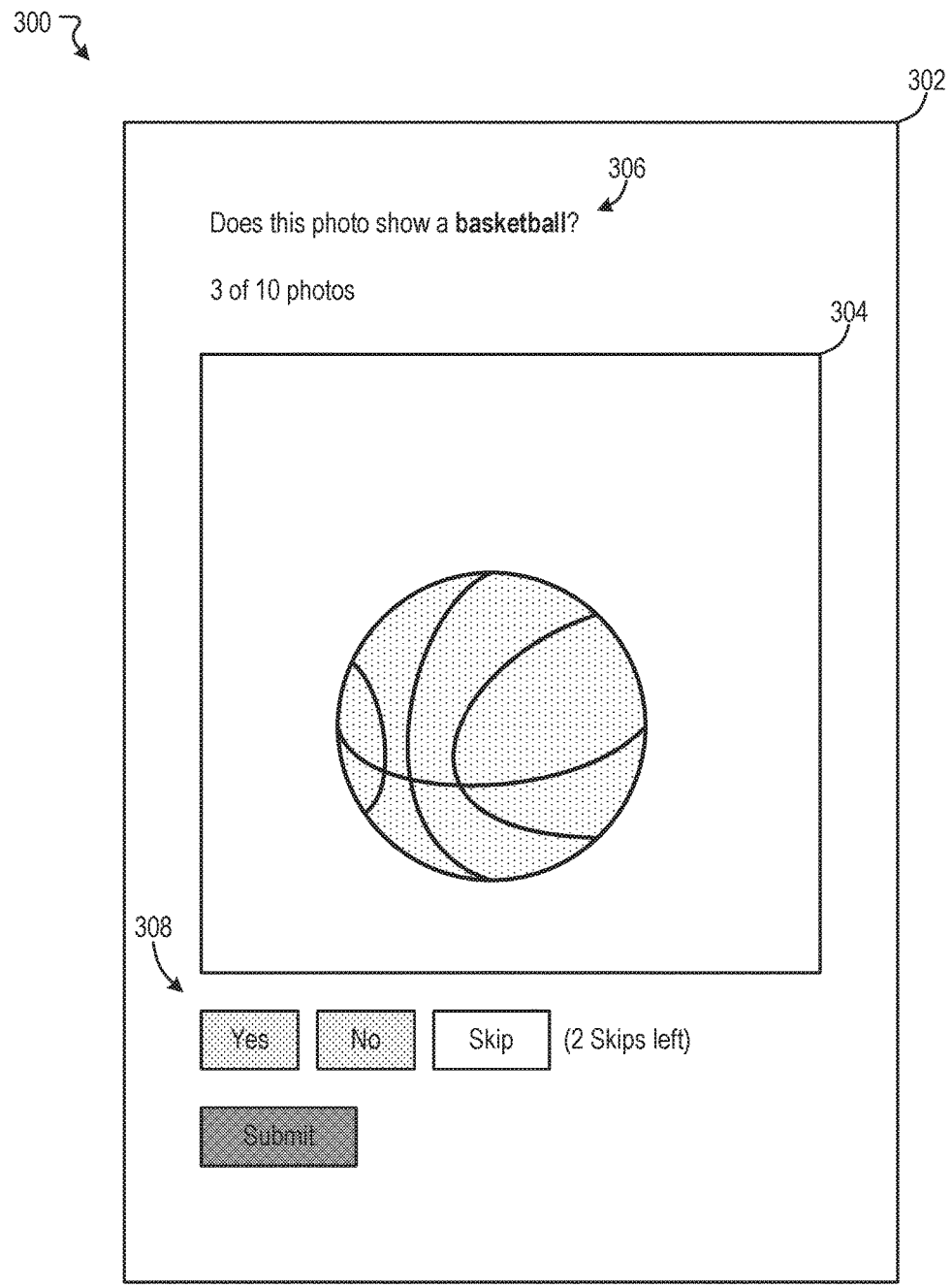
FIG. 3A illustrates an example scenario associated with providing image-based security measures, according to an embodiment of the present disclosure.

FIG. 3A illustrates an example scenario 300 associated with providing image-based security measures, according to an embodiment of the present disclosure. The example scenario 300 illustrates an example interface 302 for providing image-based security measures, such as via an image-based captcha challenge response process.

As shown in FIG. 3A, the example interface 302 can provide a first image 304 displayed during (a portion of) the challenge response process. The first image 304 can be associated with a basketball image category and thus can have a recognized category label of "basketball". In this example scenario 300, the "basketball" category label recognized for the first image 304 is presented via a natural language description in the form of a question ("Does this photo show a basketball?") 306. The interface 302 can also include an interface portion 308 for user input. In this example, if the user submits the "Yes" option, then the user can successfully complete this portion of the challenge response process.

Figure 3B:
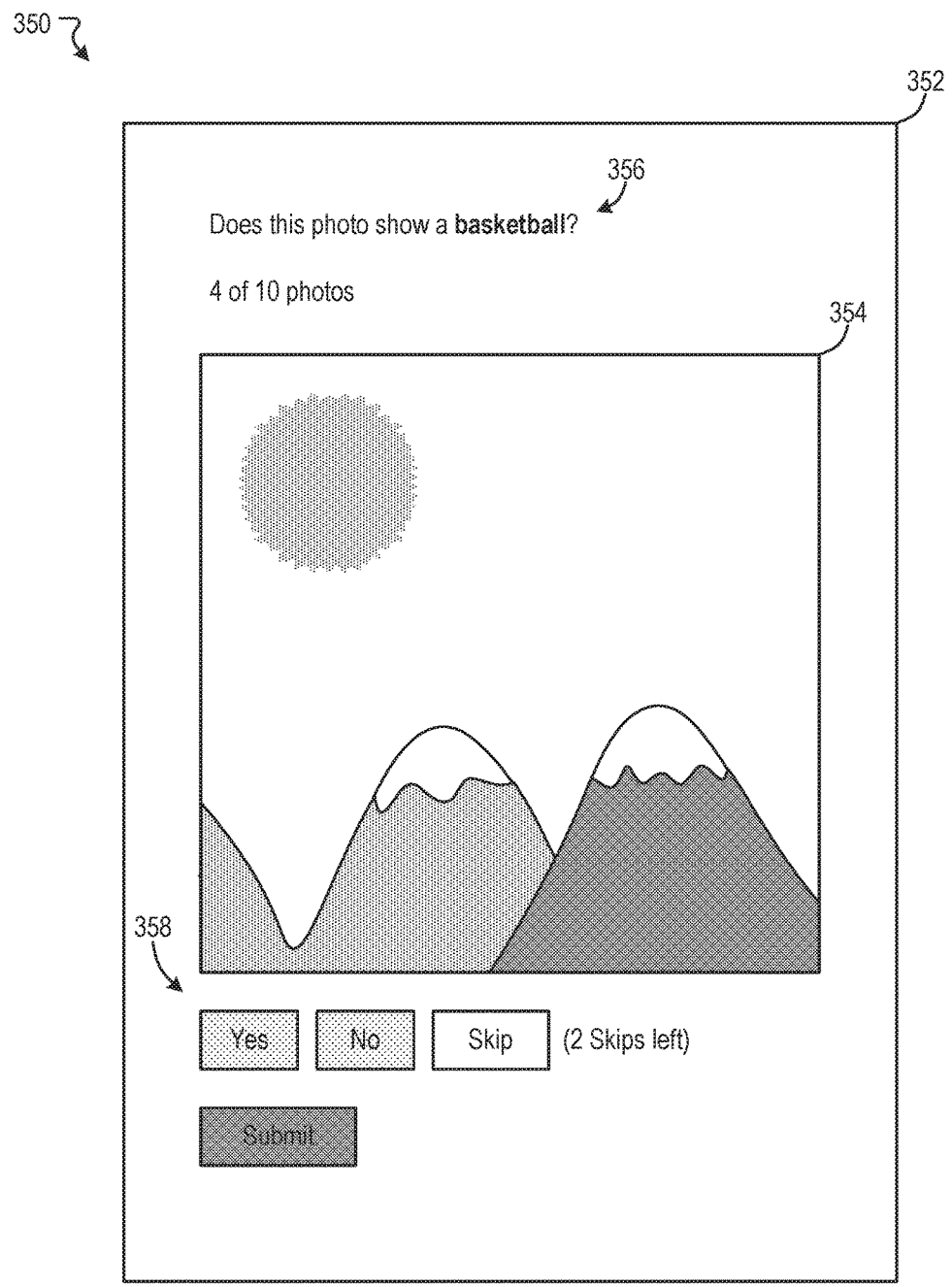
FIG. 3B illustrates an example scenario associated with providing image-based security measures, according to an embodiment of the present disclosure.

FIG. 3B illustrates an example scenario 350 associated with providing image-based security measures, according to an embodiment of the present disclosure. The example scenario 350 illustrates an example interface 352 for providing image-based security measures, such as via the image-based captcha challenge response process described with reference to FIG. 3A.

As shown in FIG. 3B, the example interface 352 can include a second image 354 displayed during (a portion of) the challenge response process. The second image 354 can be below a specified confidence threshold level of being associated with the image category (e.g., basketball) identified in the example scenario 300 of FIG. 3A.

Continuing with the example scenario 350 of FIG. 3B, the interface 352 can present another natural language description 356 for the second image 354. The interface 352 can also include an interface portion 358 for user input. If a user input received for the second image 354 indicates that the second image is unassociated with the recognized category label (e.g., "basketball") presented in the natural language description 356, then an indication that this portion of the challenge response process is successfully completed can be provided. Accordingly, in this example, if the user submits the "No" option, then the user can successfully complete this portion of the challenge response process.

Figure 4A:
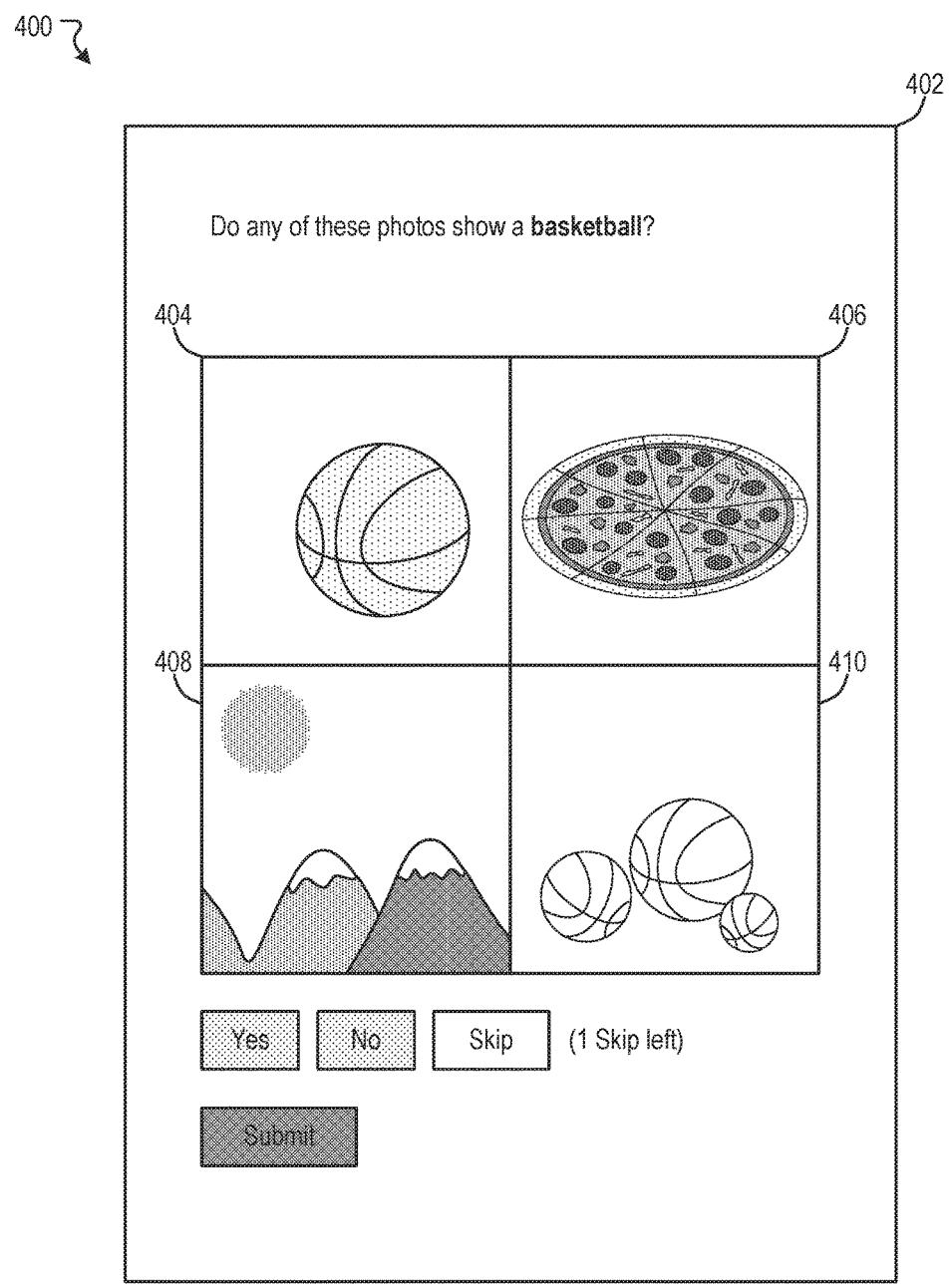
FIG. 4A illustrates an example scenario associated with providing image-based security measures, according to an embodiment of the present disclosure.

FIG. 4A illustrates an example scenario 400 associated with providing image-based security measures, according to an embodiment of the present disclosure. The example scenario 400 illustrates an example interface 402 for providing image-based security measures, such as via an image-based captcha challenge response process. As shown, the example interface 402 can provide a grid or set of images (e.g., images 404, 406, 408, and 410, etc.) displayed during (a portion of) the challenge response process. In this example, if the user submits the "Yes" option, then the user can successfully complete this portion of the challenge response process. Many variations are possible.

Figure 4B:
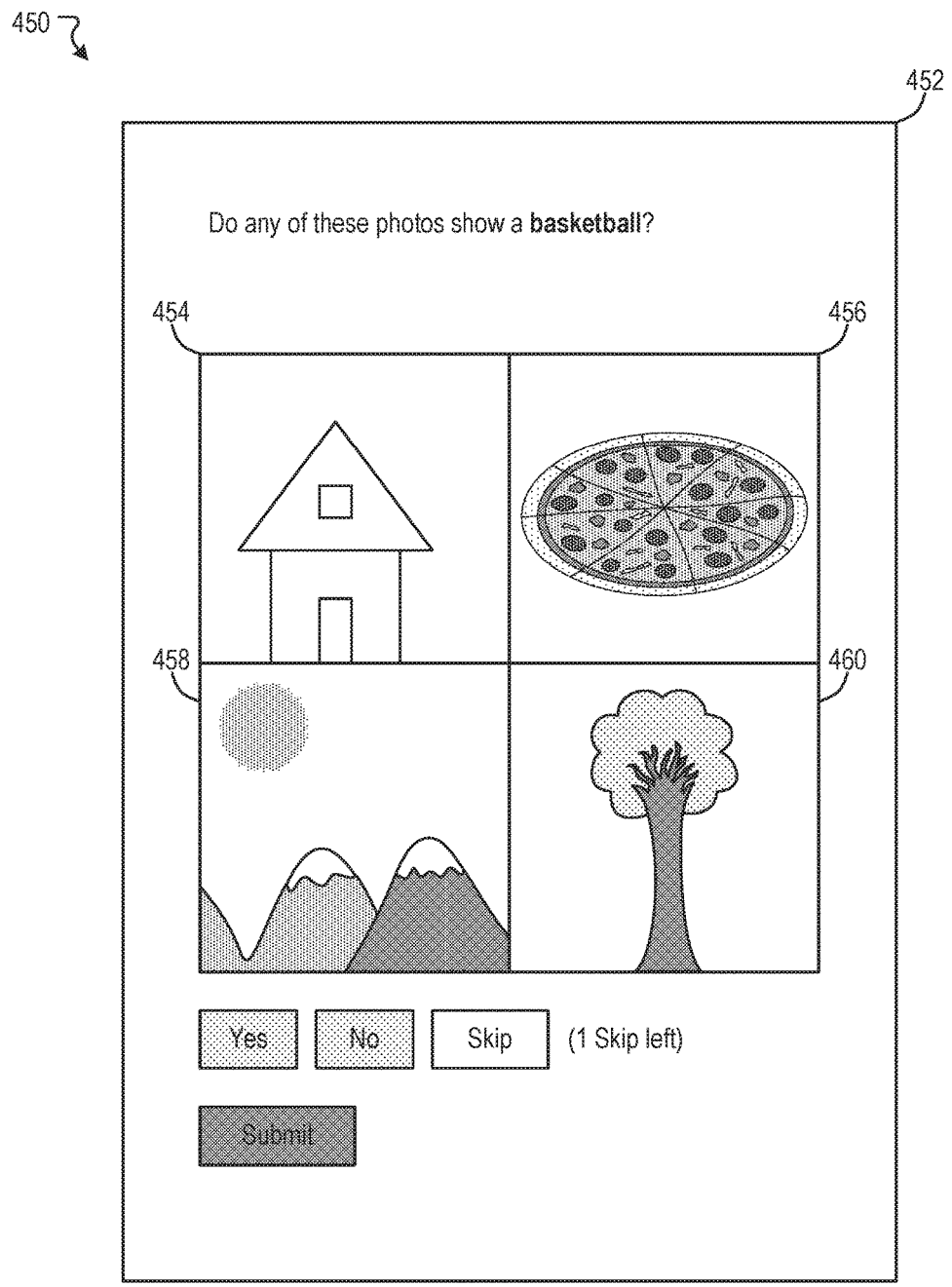
FIG. 4B illustrates an example scenario associated with providing image-based security measures, according to an embodiment of the present disclosure.

FIG. 4B illustrates an example scenario 450 associated with providing image-based security measures, according to an embodiment of the present disclosure. The example scenario 450 illustrates an example interface 452 for providing image-based security measures, such as via an image-based captcha challenge response process. As shown, the example interface 452 can provide a grid or set of images (e.g., images 454, 456, 458, and 460, etc.) displayed during (a portion of) the challenge response process. In this example, if the user submits the "No" option, then the user can successfully complete this portion of the challenge response process. Again, many variations are possible.

Figure 5:
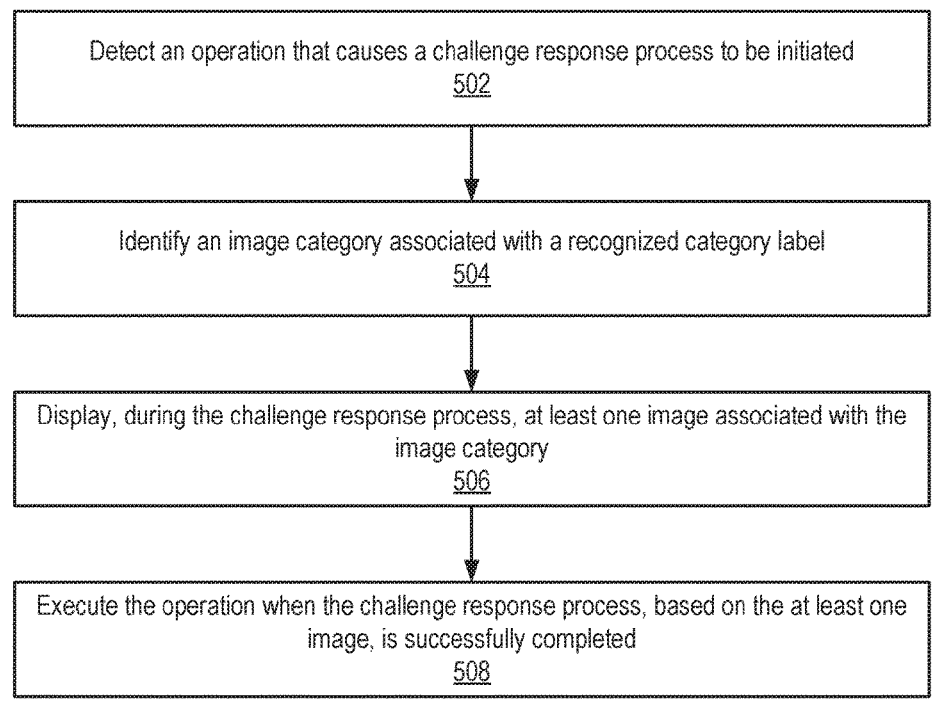
FIG. 5 illustrates an example method associated with providing image-based security measures, according to an embodiment of the present disclosure.

FIG. 5 illustrates an example method 500 associated with providing image-based security measures, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can detect an operation that causes a challenge response process to be initiated. At block 504, the example method 500 can identify an image category associated with a recognized category label. At block 506, the example method 500 can display, during the challenge response process, at least one image associated with the image category. At block 508, the example method 500 can execute the operation when the challenge response process, based on the at least one image, is successfully completed. Many variations are possible.

Figure 6A:
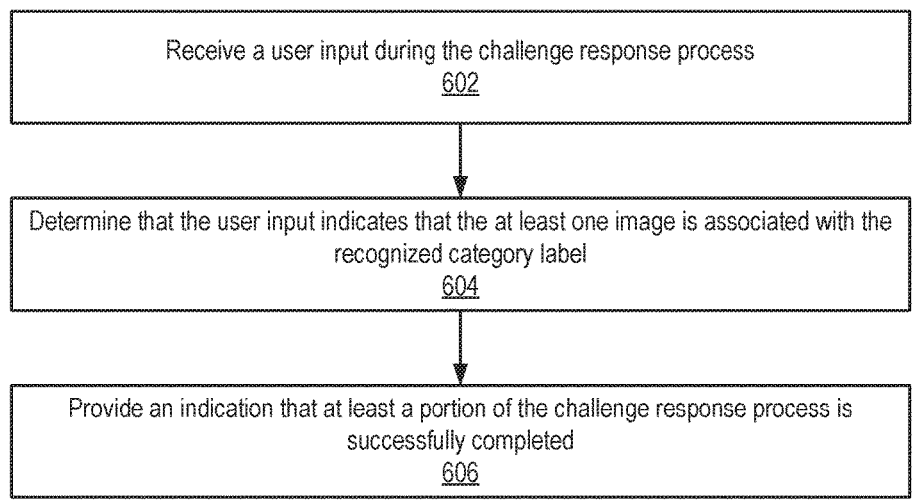
FIG. 6A illustrates an example method associated with providing image-based security measures, according to an embodiment of the present disclosure.

FIG. 6A illustrates an example method 600 associated with providing image-based security measures, according to an embodiment of the present disclosure. As discussed above, it should be appreciated that there can be additional, fewer, or alternative steps performed in similar or alternative orders, or in parallel, within the scope of the various embodiments unless otherwise stated.

At block 602, the example method 600 can receive a user input during the challenge response process. The user input can be received subsequent to the at least one image being displayed. At block 604, the example method 600 can determine that the user input indicates that the at least one image is associated with the recognized category label. At block 606, the example method 600 can provide an indication that at least a portion of the challenge response process is successfully completed. It should be appreciated that there can be numerous variations and other possibilities.

Figure 6B:
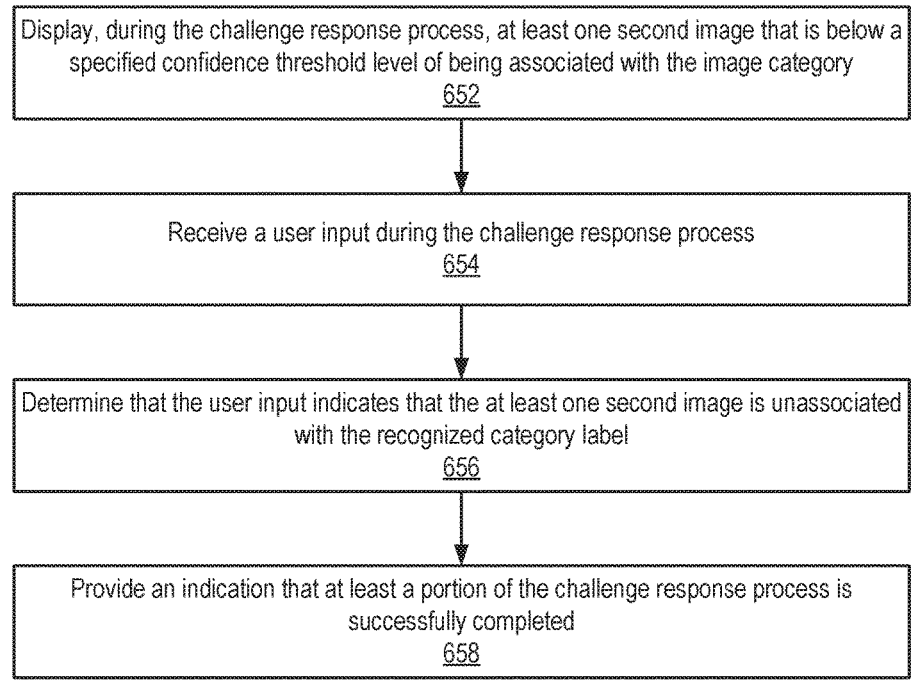
FIG. 6B illustrates an example method associated with providing image-based security measures, according to an embodiment of the present disclosure.

FIG. 6B illustrates an example method 650 associated with providing image-based security measures, according to an embodiment of the present disclosure. Again, it should be appreciated that there can be additional, fewer, or alternative steps performed in similar or alternative orders, or in parallel, within the scope of the various embodiments unless otherwise stated.

At block 652, the example method 650 can display, during the challenge response process, at least one second image that is below a specified confidence threshold level of being associated with the image category. At block 654, the example method 650 can receive a user input during the challenge response process. The user input can be received subsequent to the at least one second image being displayed. At block 656, the example method 650 can determine that the user input indicates that the at least one second image is unassociated with the recognized category label. At block 658, the example method 650 can provide an indication that at least a portion of the challenge response process is successfully completed. Again, many variations are possible.

In some embodiments, at least some of the collection of images displayed during the challenged response process as well as the corresponding user inputs can be utilized to further train or refine image classifiers. In some implementations, the collection of images can be associated with a single image category and the challenge response process can ask the user whether or not the collection of images is associated with the category label for the single image category. In some embodiments, the challenge response process can require the user to indicate where in an image a specified image object associated with the image category is located. In some implementations, various thresholds can be utilized for various image categories. Moreover, in some embodiments, the user is permitted to skip one or more portions of the challenge response process. In some instances, there can be many variations for the user interface and/or design.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
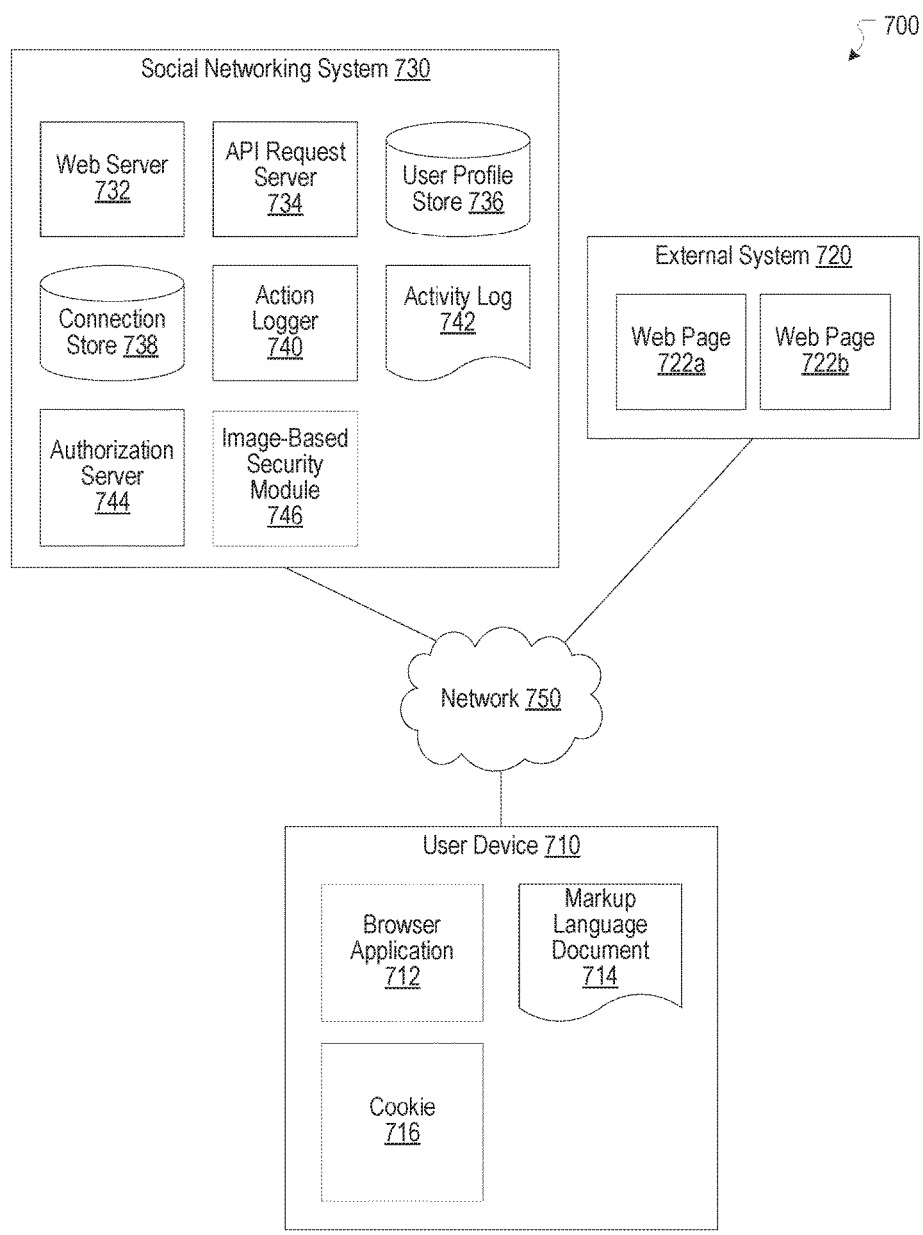
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include an image-based security module 746. The image-based security module 746 can, for example, be implemented as the image-based security module 102 of FIG. 1. As discussed previously, it should be appreciated that there can be many variations or other possibilities. For example, in some instances, the image-based security module 746 (or at least a portion thereof) can be included in the user device 710. Other features of the image-based security module 746 are discussed herein in connection with the image-based security module 102.

Hardware Implementation

Figure 8:
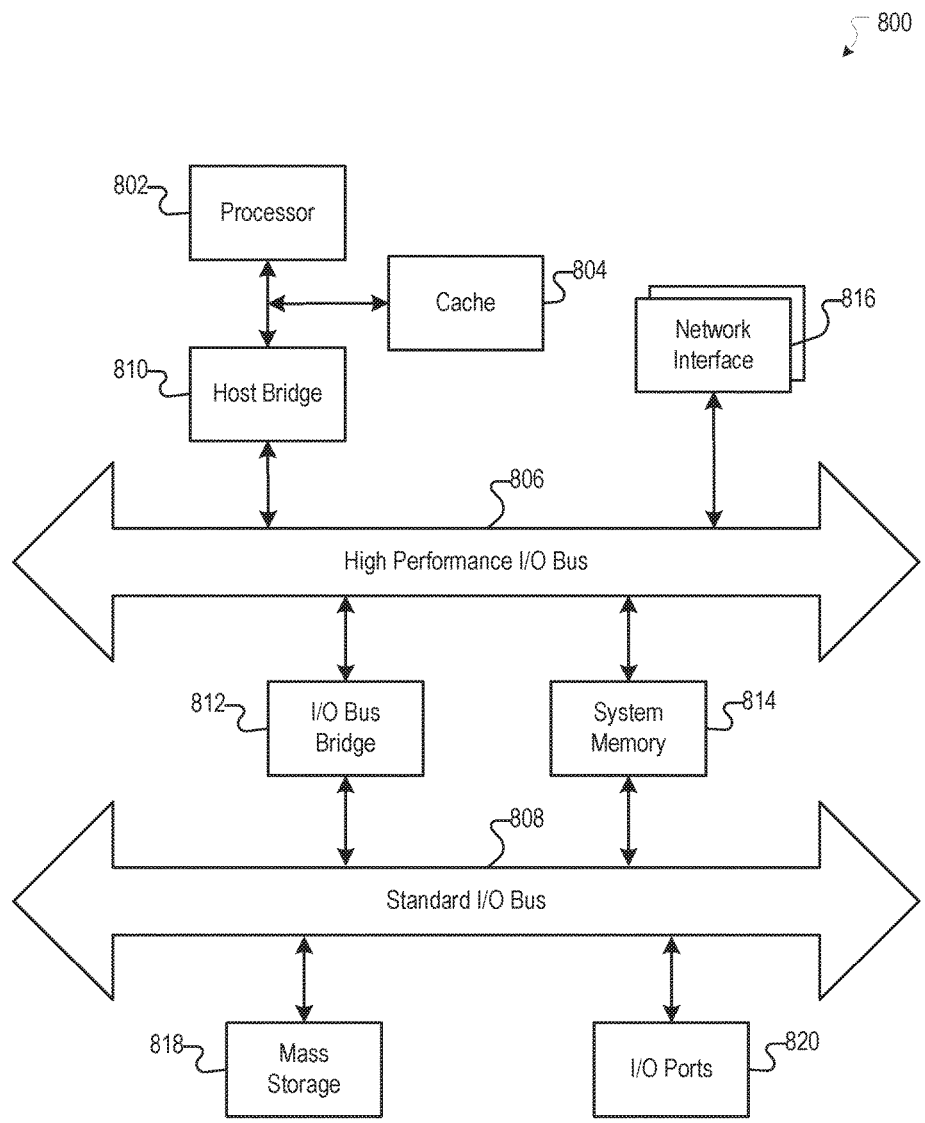
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   initiating, by a computing system, a challenge response process to determine whether a user is legitimate, wherein the challenge response process comprises an image category associated with a recognized category label and wherein the recognized category label describes a subject depicted by the image category;
   displaying, by the computing system, during the challenge response process, at least one image associated with the image category;
   receiving, by the computing system, a user input, during the challenge response process, indicating whether the at least one image is associated with the recognized category label; and
   determining, by the computing process, whether the user is legitimate based at least in part on a successful completion of the challenge response process.

2. The computer-implemented method of claim 1, further comprising:
   determining that the user input indicates that the at least one image is associated with the recognized category label; and
   providing an indication that at least a portion of the challenge response process is successfully completed.

3. The computer-implemented method of claim 2, wherein the recognized category label is presented during the challenge response process via at least one of 1) a natural language description or 2) a multiple choice selection.

4. The computer-implemented method of claim 2, wherein the at least one image is included in a collection of images displayed during the challenged response process, and wherein the user input is included in a collection of user inputs received during the challenge response process.

5. The computer-implemented method of claim 4, wherein each user input in the collection of user inputs corresponds respectively to each image in the collection of images, and wherein the indication that at least the portion of the challenge response process is successfully completed is provided when at least a threshold quantity of user inputs in the collection of user inputs correctly indicate one or more respective recognized category labels for corresponding images in the collection of images.

6. The computer-implemented method of claim 1, further comprising:
   displaying, during the challenge response process, at least one second image that is below a specified confidence threshold level of being associated with the image category;
   receiving a second user input during the challenge response process, the second user input being received subsequent to the at least one second image being displayed;
   determining that the second user input indicates that the at least one second image is unassociated with the recognized category label; and
   providing an indication that at least a portion of the challenge response process is successfully completed.

7. The computer-implemented method of claim 1, wherein the challenge response process is initiated in response to determining that a content item to be posted via a social networking system is associated with an illegitimacy confidence score at least meeting a specified illegitimacy score threshold.

8. The computer-implemented method of claim 1, wherein the at least one image is determined, based on an image classification process, to be associated with the recognized category label, and wherein the image classification process utilizes at least one image classifier trained based on a set of images associated with the image category.

9. The computer-implemented method of claim 8, wherein the set of images is updated via the social networking system over time.

10. The computer-implemented method of claim 1, wherein the at least one image is at least one of 1) selected to exclude a representation of a face, 2) modified to remove the representation of the face, or 3) modified to obscure the representation of the face.

11. A system comprising:
   at least one processor; and
   a memory storing instructions that, when executed by the at least one processor, cause the system to perform:
      initiating a challenge response process to determine whether a user is legitimate, wherein the challenge response process comprises an image category associated with a recognized category label and wherein the recognized category label describes a subject depicted by the image category;
      displaying, during the challenge response process, at least one image associated with the image category;
      receiving a user input during the challenge response process indicating whether the at least one image is associated with the recognized category label; and
      determining whether the user is legitimate based at least in part on a successful completion of the challenge response process.

12. The system of claim 11, wherein the instructions cause the system to further perform:
   determining that the user input indicates that the at least one image is associated with the recognized category label; and
   providing an indication that at least a portion of the challenge response process is successfully completed.

13. The system of claim 12, wherein the at least one image is included in a collection of images displayed during the challenged response process, and wherein the user input is included in a collection of user inputs received during the challenge response process.

14. The system of claim 11, wherein the instructions cause the system to further perform:
   displaying, during the challenge response process, at least one second image that is below a specified confidence threshold level of being associated with the image category;
   receiving a second user input during the challenge response process, the second user input being received subsequent to the at least one second image being displayed;
   determining that the second user input indicates that the at least one second image is unassociated with the recognized category label; and
   providing an indication that at least a portion of the challenge response process is successfully completed.

15. The system of claim 11, wherein the at least one image is determined, based on an image classification process, to be associated with the recognized category label, and wherein the image classification process utilizes at least one image classifier trained based on a set of images associated with the image category.

16. A non-transitory computer-readable storage medium including instructions that, when executed by at least one processor of a computing system, cause the computing system to perform:
   initiating a challenge response process to determine whether a user is legitimate, wherein the challenge response process comprises an image category associated with a recognized category label and wherein the recognized category label describes a subject depicted by the image category;
   displaying, during the challenge response process, at least one image associated with the image category;
   receiving a user input during the challenge response process indicating whether the at least one image is associated with the recognized category label; and
   determining whether the user is legitimate based at least in part on a successful completion of the challenge response process.

17. The non-transitory computer-readable storage medium of claim 16, wherein the instructions cause the system to further perform:
   determining that the user input indicates that the at least one image is associated with the recognized category label; and
   providing an indication that at least a portion of the challenge response process is successfully completed.

18. The non-transitory computer-readable storage medium of claim 17, wherein the at least one image is included in a collection of images displayed during the challenged response process, and wherein the user input is included in a collection of user inputs received during the challenge response process.

19. The non-transitory computer-readable storage medium of claim 16, wherein the instructions cause the system to further perform:
   displaying, during the challenge response process, at least one second image that is below a specified confidence threshold level of being associated with the image category;
   receiving a second user input during the challenge response process, the second user input being received subsequent to the at least one second image being displayed;
   determining that the second user input indicates that the at least one second image is unassociated with the recognized category label; and
   providing an indication that at least a portion of the challenge response process is successfully completed.

20. The non-transitory computer-readable storage medium of claim 16, wherein the at least one image is determined, based on an image classification process, to be associated with the recognized category label, and wherein the image classification process utilizes at least one image classifier trained based on a set of images associated with the image category.

* * * * *